United States Patent [19]

Rodriguez et al.

[11] Patent Number: 4,678,557

[45] Date of Patent: Jul. 7, 1987

[54] PROCESS FOR THE REGENERATION OF SPENT CATALYST USED IN THE UPGRADING OF HEAVY HYDROCARBON FEEDSTOCKS

[75] Inventors: Domingo Rodriguez, San Antonio de Los Altos; Roberto Schemel, Los Teques, both of Venezuela

[73] Assignee: Intevep, S.A., Caracas, Venezuela

[21] Appl. No.: 773,802

[22] Filed: Sep. 9, 1985

[51] Int. Cl.$^4$ .................... C10G 47/04; C10G 47/06; B01J 23/94

[52] U.S. Cl. .................... 208/112; 208/121; 423/62; 423/68; 502/38

[58] Field of Search .................... 208/112, 121; 502/38, 502/39, 50, 25, 516; 423/62, 68

[56] References Cited

U.S. PATENT DOCUMENTS

| | | | |
|---|---|---|---|
| 2,187,750 | 1/1940 | Marvin | 75/101 |
| 3,020,195 | 2/1962 | Casciani et al. | 423/DIG. 3 |
| 3,236,591 | 2/1966 | Groth | 423/DIG. 3 |
| 3,526,478 | 9/1970 | Pelczarski et al. | 423/650 |
| 4,046,670 | 9/1977 | Seguchi et al. | 208/48 AA |
| 4,067,799 | 1/1978 | Bearden, Jr. et al. | 208/112 |
| 4,325,812 | 4/1982 | Fujimori et al. | 208/119 |
| 4,399,023 | 8/1983 | Suzuka et al. | 208/112 |
| 4,472,360 | 9/1984 | McCorriston | 423/68 |

FOREIGN PATENT DOCUMENTS

| | | | |
|---|---|---|---|
| 0060618 | 9/1982 | European Pat. Off. | 502/38 |
| 0161493 | 12/1981 | Japan | 208/112 |
| 0003886 | 1/1982 | Japan | 208/112 |

*Primary Examiner*—Olik Chaudhuri
*Attorney, Agent, or Firm*—Bachman & LaPointe

[57] ABSTRACT

A process for the regeneration of a spent catalyst used in the upgrading of heavy hydrocarbon feedstocks comprises roasting a spent natural iron base catalyst contaminated with carbon, sulfur and vanadium at a temperature of not more than 400° C. in the presence of a carbonate selected from the group consisting of sodium, potassium, and mixtures thereof so as to eliminate carbon from the catalyst and obtain a roasted product containing iron oxide and water soluble salts of sulfur and vanadium. The roasted product is thereafter water leached so as to dissolve the soluble salts of sulfur and vanadium. The regenerated catalyst is thereafter separated from the leaching liquor so as to obtain a catalyst substantially free of carbon and sulfur.

8 Claims, 1 Drawing Figure

PROCESS FOR THE REGENERATION OF SPENT CATALYST USED IN THE UPGRADING OF HEAVY HYDROCARBON FEEDSTOCKS

BACKGROUND OF THE INVENTION

The present invention is drawn to a process for regenerating a spent catalyst used in the upgrading of heavy hydrocarbon feedstocks and, more particularly, a process for regenerating a spent natural iron base catalyst.

In processing heavy hydrocarbon feedstocks for upgrading same into usable distillates, natural catalysts of laterite, limonite and bauxite type have been widely used. Generally in hydrocracking processes for upgrading these heavy hydrocarbon feedstocks catalysts are added in quantities ranging from 5 to 10% by weight with respect to the feedstock. After the hydrocracking process it is necessary to separate the spent catalyst from the processed hydrocracked product. The waste catalyst from the separation stage contains up to 35 wt.% carbon, up to 30 wt.% sulfur and from about 1.0 to 1.5 wt.% vanadium. Heretofore, the waste catalyst generally cannot be used in any other processing stages for upgrading heavy crude and therefore must be considered as a disposable product. In a commercial plant for hydrocracking heavy hydrocarbon feedstocks in which 100,000 barrels of feedstock are processed a day, approximately 800 tons per day of waste catalyst is produced. The problems associated with handling the volume of waste catalyst produced are numerous. These problems include the costs for transporting and storing of the waste catalysts. However, a more serious and more important problem results from the fact that the catalysts used in the hydrocracking process, as noted above, are naturally occurring catalysts which have limited known reserves.

In light of the foregoing, it would be highly desirable to provide an efficient process for regenerating the spent natural catalysts used in the upgrading of heavy hydrocarbon feedstocks in the hydrocracking process of same. In addition, it would be extremely efficient to develop a process for regenerating spent natural catalysts wherein the regenerated catalysts could again be employed with the hydrocracking process for upgrading heavy hydrocarbon feedstocks.

Accordingly, it is a principal object of the present invention to develop a process for the regeneration of a spent natural catalyst used in upgrading heavy hydrocarbon feedstocks.

It is a particular object of the present invention to provide a process as aforesaid wherein the regenerated spent catalysts have physical and structural characteristics similar to the virgin natural catalyst.

It is a further object of the present invention to provide a process as aforesaid wherein the regenerated catalyst has an activity in treating heavy hydrocarbon feedstocks similar to that obtained with a virgin catalyst.

It is a still further object of the present invention to provide a process as aforesaid which is economical and highly efficient.

Further objects and advantages will appear hereinbelow.

SUMMARY OF THE INVENTION

In accordance with the present invention the foregoing objects and advantages are readily obtained.

The present invention is drawn to a process for the regeneration of a spent natural iron base catalyst used in the upgrading of heavy hydrocarbon feedstocks. In accordance with the present invention a spent natural iron base catalyst containing carbon, sulfur and vanadium as impurities is roasted at a temperature of not more than 400° C. in the presence of a carbonate selected from the group consisting of sodium, potassium and mixtures thereof so as to eliminate carbon from said catalysts and obtain a roasted product comprising iron oxide and water soluble salts of sulfur and vanadium. The roasted product is then water leached to dissolve the soluble salts of sulfur and vanadium and the iron base regenerated catalyst is thereafter separated from the leaching liquor so as to obtain a regenerated iron base catalyst substantially free of carbon and sulfur. In accordance with the present invention the separated leaching liquor may be, if desired, bubbled with carbon dioxide so as to obtain a carbonate selected from the group consisting of sodium, potassium, calcium and mixtures thereof. The recovered carbonates may then be recycled to the roasting stage so as to produce the water soluble salts of sulfur and vanadium.

In accordance with a particular feature of the present invention the natural iron base catalyst regenerated in accordance with the process of the present invention is a catalyst selected from the group consisting of laterite, limonite, bauxite and mixtures thereof.

DETAILED DESCRIPTION

Figure 1:
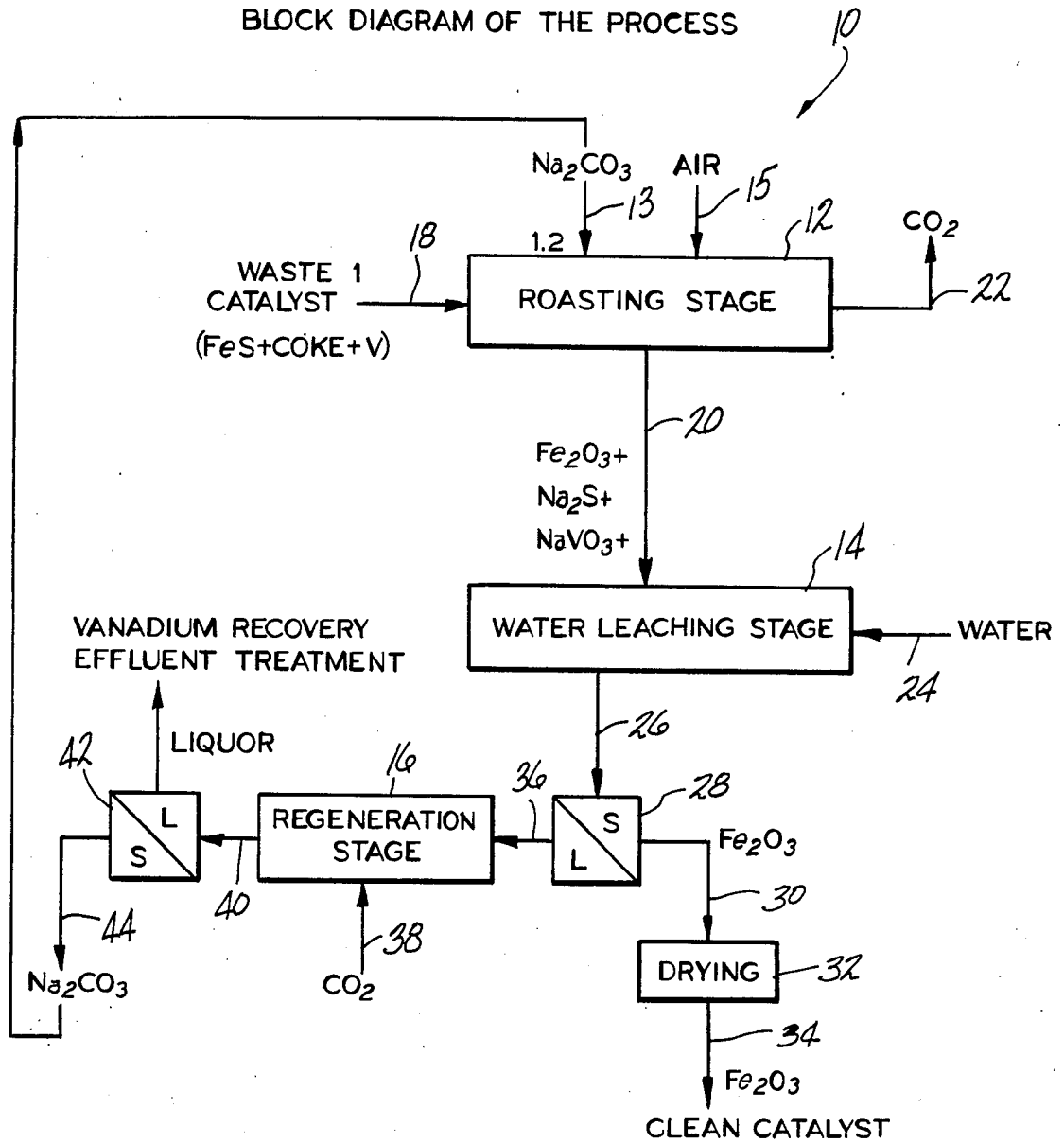
FIG. 1 is a schematic block diagram illustrating the process of the present invention.

The process of the present invention will be described with reference to FIG. 1. The regeneration process 10 of the present invention includes three stages: a roasting stage 12, a catalyst washing stage 14 and a carbonate regeneration stage 16. In accordance with the process of the present invention a spent naturally occurring iron base catalyst recovered from the hydrocracked product of a hydrocracking processor is fed via line 18 to the roasting stage 12. The naturally occurring iron base catalyst is selected from the group consisting of laterite, limonite, bauxite and mixtures thereof. Typically, the spent natural catalyst from the hydrocracking process contains up to 35 wt.% carbon, up to 30 wt.% sulfur and from about 1.0 to 1.5 wt.% vanadium. The waste catalyst is mixed in the roasting stage 12 via lines 13 and 15 respectively with a carbonate selected from the group consisting of sodium, potassium and mixtures thereof and air and roasted at a temperature of not more than 400° C. in the presence of the carbonate and air for up to 8 hours so as to eliminate the carbon from the spent catalyst via line 22 and obtain a roasted catalyst product containing iron oxide and water soluble salts of sulfur and vanadium. In accordance with the process of the present invention the carbonate is added to the waste catalyst in a ratio of from about 0.25:1 to 1:1 with respect to the waste catalyst.

the product of the roasting stage 12 which comprises iron oxide and water soluble salts of sulfur and vanadium is removed via line 20 and fed to catalyst washing stage 14. Carbon dioxide, a by-product of the roasting operation, is taken off via line 22. The roasted product is water leached in catalyst washing stage 14 by introducing water via line 24 into stage 14 wherein the salts of sulfur and vanadium go into solution leaving a substantially iron oxide green product. The roasted product is water leached with water until the pH of the leaching liquor reached a pH of about 7. The product from the catalyst washing stage is thereafter removed via line 26 to a separator 28 wherein the green iron oxide solid product is removed via line 30 to dryer 32 where it is dried so as to produce a regenerated iron base catalyst which is removed via line 34 and may if desired be recycled to the hydrocracking processor. The water leaching liquor from separator 28 is removed via line 36 and fed to a carbonate regenerating stage 16 wherein the sodium, potassium or mixtures thereof is regenerated by bubbling $CO_2$ gas in an amount equal to about 40 to 50 wt.% of the carbonate used in the roasting stage 12 through the leaching liquor via line 38 so as to produce a carbonate of sodium, potassium and mixtures thereof. The resultant product from the regeneration stage 16 is removed via line 40 to a separator 42 where the carbonate is removed via line 44 and recycled via line 44 to line 13.

The process of the present invention will be made clear from the following example.

EXAMPLE

A natural iron base limonite catalyst used for the hydroprocessing of a heavy hydrocarbon feedstock, namely Zuata 44X 950° F.+, having the following composition was separated from the hydroprocessed product.

| API Gravity | 1.9 |
|---|---|
| Kinematic Viscosity, cst | |
| at 140° F. | 60708 |
| at 210° F. | 185 |
| Carbon Conradson, wt. % | 25.37 |
| Sulfur, wt. % | 4.4 |
| Carbon, wt. % | 83.14 |
| Hydrogen, wt. % | 9.66 |
| Nitrogen, ppm | 9988 |
| Vanadium, ppm | 746 |
| Nickel, ppm | 157 |
| Ash, wt. % | 0.15 |

The spent limonite catalyst was analyzed and had the following composition: iron 45.2 wt.%, carbon 27.0 wt.%, sulfur 26.6 wt.% and vanadium 1.2 wt.%. The spent catalyst weighing 1998.2 grams was roasted in the presence of sodium carbonate in a ratio of 1:1 by weight with respect to the waste catalyst at a temperature of 350° C. for about 8 hours so as to form water soluble salts of sulfur and vanadium. The total weight of the sodium carbonate and waste catalyst was 3996.4 grams. After the roasting process the roasted product was washed with fresh water to dissolve the soluble salts. The washing time was controlled by measuring the pH of the washing liquor. The washing stage was completed when the pH of the washing liquor reached 7. The catalyst was thereafter separated from the washing liquor and dried in an oven at a temperature of 140° C. The washing liquor was thereafter treated in a regeneration stage where it was bubbled with $CO_2$ gas in an amount of 500 LTS at Standard Pressure and Temperature so as to regenerate sodium carbonate. The sodium carbonate was thereafter removed and recycled back to the roasting stage.

The separated dried catalyst was then weighed to determine the catalyst yield. The weight of the regenerated dried catalyst was 999.3 grams which is equivalent to 50.01% of the original waste catalyst thereby indicating that almost the entire amount of carbon, sulfur and vanadium present in the pretreated waste catalyst had been removed. A comparison of the physical properties of the regenerated catalyst and the properties of the original virgin catalysts were compared. The results are set forth below.

TABLE I

| | Regenerated Catalyst | Virgin Catalyst |
|---|---|---|
| Iron Content (% w) | 66.2 | 61.6 |
| Vanadium Content (ppm) | 6183 | — |
| Carbon Content (% w) | 0.2 | — |
| Macroporous Volume (cc/g) | 0.42 | 0.40 |
| Average ∅ (μ) | 7.0 | 2.6 |
| Sodium Content (ppm) | 1460 | — |
| Sulfur Content (% w) | 0.17 | — |

From the foregoing results it is shown that the vanadium content decreased about 50% while the sulfur and carbon contents of the regenerated catalyst are reduced in excess of 99% with respect to the initial content in the waste catalyst.

In order to determine the activity of the regenerated catalyst, catalyst activity was compared to that of a virgin catalyst in treating 950° F.+ residuum from Zuata 44X crude oil. The operating conditions were as follows: Feed Weight: 1300 g., Operating Temperature: 450° C., Operating pressure: 1900 psig, Catalyst weight percent: 8%, $H_2$ Flowrate: 16 l/min., Stirring speed: 900 rpm, Test time: 3 hrs. The activity test results are shown in the following Table.

TABLE II

| | Regenerated Catalyst | Virgin Catalyst |
|---|---|---|
| Gas yield (%) | 17.9 | 16.5 |
| Coke yield (%) | 4.1 | 3.5 |
| Liquid yield (%) | 78.0 | 80.0 |
| Vaporization (%) | 64.5 | 61.8 |
| $H_2$/Feed Ratio | 11.034 | 10.875 |
| Product API Gravity | 31.2 | 29.0 |
| Asphaltene conversion (%) | 95 | 91 |
| Conradson Carbon Conversion (%) | 94 | 89 |
| Distillates (g) | 654 | 642 |
| % C in catalyst | 32.0 | 28.2 | from the above results it can be seen that the activity of the regenerated catalyst is very similar to that of the natural virgin catalyst, with a slightly less liquid yield but with a higher conversion of asphaltenes, Conradson carbon and API gravity in the case of the regenerated catalyst.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the regeneration of a spent natural iron base catalyst used in the upgrading of heavy hydrocarbon feedstocks comprising:

providing a spent natural iron base catalyst containing carbon, sulfur and vanadium as impurities;

roasting said catalyst at a temperature of not more than 400° C. in the presence of a carbonate selected from the group consisting of sodium, potassium and mixtures thereof so as to eliminate carbon from said catalyst and obtain a roasted product comprising iron oxide and water soluble salts of sulfur and vanadium;

water leaching said roasted product to dissolve the soluble salts of sulfur and vanadium; and separating said catalyst from said leaching liquor so as to obtain a regenerated catalyst substantially free of carbon and sulfur.

2. A process according to claim 1 including bubbling said separated leaching liquor with $CO_2$ so as to obtain a carbonate selected from the group consisting of sodium, potassium and mixtures thereof and separating and recycling said carbonate to the roasting stage.

3. A process according to claim 1 wherein said catalyst is roasted for up to 8 hours.

4. A process according to claim 1 including water leaching said roasted product until said leaching liquor reaches a pH of about 7.

5. A process according to claim 1 including mixing said carbonate in a ratio of from about 0.25:1 to 1:1 with respect to said spent catalyst.

6. A process according to claim 1 wherein said spent catalyst contains up to about 35 wt.% carbon, up to about 30 wt% sulfur and from about 1.0 to 1.5 wt.% vanadium.

7. A process according to claim 1 wherein said natural iron base catalyst is selected from the group consisting of laterite, limonite, bauxite and mixtures thereof.

8. A hydrocracking process for the upgrading of a heavy crude feedstock comprising:

hydrocracking said hydrocarbon feedstock in the presence of a natural iron base catalyst wherein said catalyst becomes contaminated with carbon, sulfur and vanadium;

roasting said contaminated catalyst at a temperature of not more than 400° C. in the presence of a carbonate selected from the group consisting of sodium, potassium and mixtures thereof so as to eliminate carbon from said catalyst and obtain a roasted product comprising iron oxide and water soluble salts of sulfur and vanadium;

water leaching said roasted product to dissolve the soluble salts of sulfur and vanadium;

separating said catalyst from said leaching liquor so as to obtain a regenerated catalyst substantially free of carbon and sulfur; and recycling said regenerated catalyst to the hydrocracking stage.

* * * * *